United States Patent [19]

Sarvela

[11] 4,317,593
[45] Mar. 2, 1982

[54] HIGH LIFT DUMP TRAILER

[76] Inventor: Jussi Sarvela, 1360 Terrace Dr., Apt. 303, St. Paul, Minn. 55113

[21] Appl. No.: 105,374

[22] Filed: Dec. 19, 1979

[51] Int. Cl.³ .............................................. B60P 67/32
[52] U.S. Cl. .................................. 298/11; 298/17 SG; 414/471; 414/485; 280/43.24; 280/764
[58] Field of Search ............... 414/420, 421, 458, 469, 414/471, 482, 485; 298/5, 11, 17 SG, 20 R; 212/189; 280/43.23, 43.24, 475, 764

[56] References Cited

U.S. PATENT DOCUMENTS

| | | | |
|---|---|---|---|
| 3,066,984 | 12/1962 | Hori | 298/11 |
| 4,043,403 | 8/1977 | Anderson et al. | 280/43.23 |

FOREIGN PATENT DOCUMENTS

| | | | |
|---|---|---|---|
| 1324375 | 3/1963 | France | 298/11 |
| 1500599 | 11/1967 | France | 298/11 |
| 2383062 | 10/1978 | France | 414/458 |
| 237004 | 12/1967 | U.S.S.R. | 212/189 |

*Primary Examiner*—Robert W. Saifer
*Attorney, Agent, or Firm*—Jacobson and Johnson

[57] ABSTRACT

A high lift dump box trailer for lifting, transporting and dumping a load of material at a high elevation. The trailer includes a pair of retractable members that stabilize the trailer to permit dumping of the contents of the dump box when the dump box is in an elevated condition. The trailer includes a hydraulic suspension system that provides for wheel adjustment when transporting a load on a side hill and a fluid accumulator shock absorber system that provides for smooth riding over rough roads.

7 Claims, 4 Drawing Figures

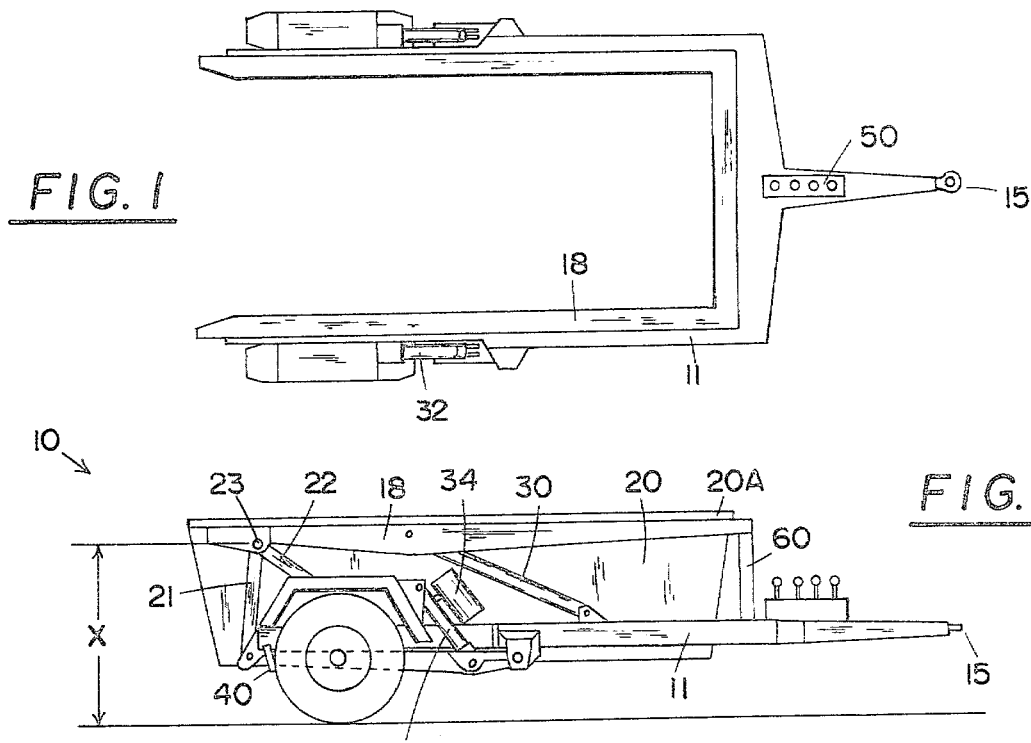
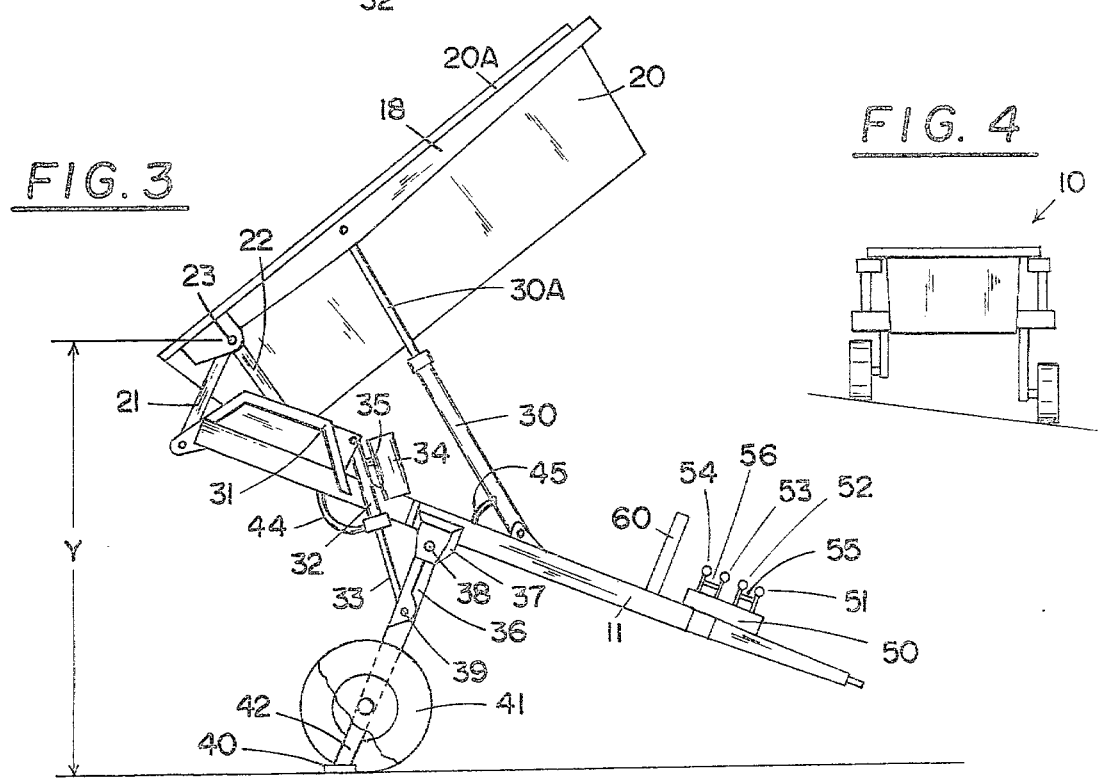

HIGH LIFT DUMP TRAILER

DESCRIPTION OF THE PRIOR ART

The concept of a trailer-type vehicle for lifting, transporting and depositing loads is more fully described in my U.S. Pat. No. 4,049,143. My prior art patent shows a trailer having positionable members for lifting, transporting and emptying a load from a dump box located on the trailer frame. My prior art trailer has a lower and upper substantially U-shaped frame. The lower frame has at least a pair of wheels and attaches to a pulling vehicle. The upper frame connects to the lower frame through a collapsing structure that permits one to raise or lower the upper frame with respect to the lower frame. With the upper frame in the lowered position, one can back the trailer up to a dump box, i.e. the U-shaped opening formed by the U-shaped frame permits the dump box to set on the ground while the trailer is backed into position around the dump box. After positioning the dump box within the confines of the U-shaped frame, one can raise the upper frame to lift the dump box off the ground. The dump box and contents can then be transported to a desired location.

In may prior art trailer patent, 4,049,143, I show U-shaped frames which define a load receiving space. On opposite sides of the trailer are a first pair of fluid pressure devices which connect the lower frame to the upper frame to permit raising and lowering of the upper frame. A second pair of fluid pressure devices coact to rotatably turn the upper frame above a rear pivot axis. The second pair of pressure members permit one to empty the contents of the dump box by tilting the upper frame about a rear pivot member, similar to a dump truck. While my prior art dump box words well for most applications, it is difficult to empty the contents of the box into any container or truck box that is elevated substantially above the ground. Usually, the dump box contains heavy material which, if raised, elevates the center of gravity of the trailer and dump box thus producing an unstable system, particularly if the vehicle has air inflated tires for road use.

Another prior art vehicle is shown in the Poole U.S. Pat. No. 3,468,440. Poole also shows a U-shaped trailer and hydraulic arms for loading and unloading a box.

Still another type of carrier is shown in the prior art Owen U.S. Pat. No. 3,083,850. Owen shows a dump box in which the dump box is pivoted rearward about a pivot axis through application of a signal to a hydraulic cylinder.

The present invention provides improvement to prior art devices by providing means to automatically stabilize the trailer in an elevated condition to permit an operator to safely empty the dump box. The feature of elevating and then stabilizing the dump box permits one to dump the contents of the dump box from the ground into a truck box or the like. In addition, my trailer includes suspension system that has positionable wheel supports which coupled with an accumulator system smooths the ride of the trailer when a load is transported over rough terrain.

BRIEF DESCRIPTION OF THE DRAWING

FIG. 1 is a top view of my invention;
FIG. 2 is a side view of my invention in the transporting position;
FIG. 3 is a side view of my invention in the dumping position; and
FIG. 4 is a rear view showing the positionable features of the wheel supports of my invention.

BRIEF SUMMARY OF THE INVENTION

Briefly, the present invention comprises a high dumping unit having a frame with a pair of pivot arms with support wheels attached thereto. Connected to the pivot arms are a pair of stabilizing members that engage the ground to stabilize the unit when the dump box has been elevated. The stabilizing units firmly engage the ground during emptying of the dump box but are retracted when the dump box is in the transporting position. The unit includes a fluid pressure system for positioning each pivot arm and support wheel as well as an accumulator shock absorber system to provide a smooth ride over rough terrain.

DESCRIPTION OF THE PREFERRED EMBODIMENT

Referring to the drawing, FIG. 1 shows a top view of my high dump trailer 10 without a dump box thereon. FIG. 2 shows the trailer frame comprising a lower U-shaped member 11 and an upper U-shaped member 18. FIG. 2 shows upper U-shaped member 18 supporting a dump box 20 around an outward peripheral edge 20a. FIG. 2 also shows upper member 18 in the conventional horizontal road transporting position. In the loading position, upper member 18 is lowered to permit disengagement of edge 20a as dump box 20 is set on the ground. The details of such operation are described more fully in my U.S. Pat. No. 4,049,143, however, to illustrate the principle one can disconnect member 22 at one end to permit frame 18 to pivot rearward from front support 60 and rearward on member 21. To raise upper frame 18 the process is reversed by moving upper frame 18 forward.

Located on one side of trailer 10 are a pair of pivotal support members 21 and 22 which are joined to upper frame 18 by a pivot pin 23. Located on the opposite side of upper frame 18 although not shown are an identical pair of pivotal support members. When both ends of member 21 and member 22 are locked, the pivotal support members 21 and 22 provide a pivot axis through pivot pin 23 that permits one to empty the contents of dump box 20 by tipping upper frame 18 and dump box 20 about pivot pin axis passing through pivot pin 23. Note, the axis about which the load is dumped is denoted by the dimension X.

Attached to upper frame 18 and connected to lower frame 11 is a hydraulic cylinder 30 having an extendible ram 30a. Hydraulic cylinder 30 connects to a source of fluid pressure (not shown) through a hose 45 that connects to a hydraulic valve control box 50. Hydraulic valve control box 50 connects to a source of hydraulic fluid pressure (not shown). Similarly located on the opposite side of trailer 10 and connected to the upper frame 18 and lower frame 11 is another hydraulic cylinder (not shown), which fastens in identical manner to hydraulic cylinders 30. These two hydraulic members located on the opposite side connect to a source of hydraulic pressure through pressure control members 51 and 52. Members 51 and 52 are connected together by a locking member 55 which permits both member 30 and its opposite member to move in unison.

In operation, supplying hydraulic fluid under pressure to hydraulic member 30 can be used to tilt dump box 20 as shown in FIG. 3 or to maintain horizontal elevation of dump box 20 as upper frame 18 is raised. Similarly, reduction of the pressure in the hydraulic cylinder lowers dump box 20 to the position shown in FIG. 2.

Connected to lower frame 11 is a retractable wheel support member comprising a pivotal member 36 which mounts to frame 11 through pivot pin 38 that extends from frame 11 into housing 37. Located on one end of wheel support member 36 is a stabilizing arm 42 which extends beyond the axis of wheel 41. Connected to the end of stabilizing arm 42 is a stabilizing support pad 40. FIG. 2 shows support pad 40 and stabilizing arm 42 in the retracted position while FIG. 3 shows support pad 40 and stabilizing arm 42 in the stabilizing position. Also, pivotally connected to frame 11 is a hydraulic cylinder 32 which has an extandible ram 33 that is pivotally connected to pivotal wheel support member 36 through a pivot pin 39. In the extended position ram 33 holds wheel support member 36 away from frame 11 as shown in FIG. 3 while in the retracted position wheel support member 36 permits the wheel support member to rest on or nearly on frame 11 as shown in FIG. 2. In the extended position the rear end of trailer 11 is in the elevated position with the distance of pivot pin axis 23 above the ground denoted by Y.

Located on hydraulic cylinder 32 is an accumulator 34 that connects to hydraulic cylinder 32 through a pipe 35. Accumulators are known in the art and comprise a reservoir of compressible fluid that compresses with an increase of force on the hydraulic system thereby permitting movement of a hydraulic ram in the system without substantial increase or decrease of the pressure in the system. In the trailer device, as shown in FIG. 2, the compressible air or gas in the accumulator permits ram 33 to move in and out in response to bumps on the road thus providing a shock absorbing system. While the pivotal wheel support member on one side of trailer 11 has been described, it should be understood that the opposite side of trailer 10 includes an identical pivotal wheel support member and an extendible ram that permits the raising the lowering of the opposite wheel support member in an identical manner.

To provide for raising and lowering of hydraulic cylinder 32 and its opposite counterpart (not shown), there is provided a hose 44 that connects to hydraulic cylinder 32 and valve control box 50. Valve 53 controls operation of one wheel support member while valve 54 controls operation of the opposite wheel support member. Valves 53 may be operated separately or ganged together by locking member 56 to each of valves 53 and 54. In the independent operation, wheel support members can be adjusted as shown in FIG. 4 to provide for transportation of heavy loads on side hills.

To understand the operation of my improved dumping unit reference should be made to FIG. 2 which shows dump box 20 rising on upper frame 18. To begin the dumping process an operator sends a pressure signal through valve 53 and 54. The pressure signal extends ram 33 and its opposite counterpart thereby pivoting wheel support member 30 away from member 11. The signal is applied until wheel support member 30 and its counterpart are positioned as shown in FIG. 3. In this position the stabilizing pad 40 on stability arm 32 engages the ground to provide a stabilizing support for trailer frame 11. In the elevated position it is noted the rear of trailer 11 has been elevated off the ground a distance of Y which, typically, may range anywhere from seven to nine feet.

Next, the operator activates valves 51 and 52 which extends ram 30a and its opposite counterpart (not shown) as in FIG. 3. The extension of the rams pivots upper frame 18 and dump box about pivot pin axis 23 as shown in FIG. 3. As can be seen in FIG. 3, the contents of dump box is emptied at a distance Y which typically may vary from seven to nine feet.

To lower dump box 20 and frame 18, the process is reversed by lowering the dump box and then allowing pivotal wheel support members to collapse to the horizontal position shown in FIG. 2. In this position trailer 10, with its stabilizing bars, can be transported without interference from the stabilizing arms attached to the wheel support members.

In operation the front end of unit 10 may be supported by a vehicle attached to eye 15 or eye 15 may be placed on the ground to provide a third contact point to thereby provide the stability of a three member support.

I claim:

1. A high dumping unit comprising:
   a main frame, said main frame operable for holding a dump box;
   a pair of retractable wheel support members pivotally attached to said main frame, a wheel having an axis mounted on each of said wheel support members, said retractable wheel support members operable for elevating said main frame, said wheel support members including stabilizing members for engaging a ground surface, each of said wheel support members pivotally mounted about the axis of each of said wheels to permit pivoting said wheel support member with respect to said main frame and each of said axis to thereby elevate the main frame so that when said main frame is in an elevated position said stabilizing members engage a ground surface to provide a stable support for said main frame; and
   means for emptying a dump box located on said main frame, said means operable for emptying the contents of a dump box held in said main frame.

2. The invention of claim 1 wherein said stabilizing members are an extension of each of said wheel support members, said stabilizing members including a stabilizing pad for engagement of the ground surface.

3. The invention of claim 2 wherein each of said retractable wheel support members include a hydraulic cylinder having an extendible ram for raising and lowering said wheel support members with respect to said main frame to thereby respectively raise or lower said main frame.

4. The invention of claim 3 including an accumulator connected to each of said hydraulic cylinders to thereby provide an accumulator suspension system that permits individual upward and downward movement of said wheel support members with respect to said main frame.

5. The invention of claim 4 including means for individually positioning said wheel support members.

6. The invention of claim 5 wherein said main frame has a U shape to permit an operator to back said main frame around a dump box.

7. The invention of claim 6 wherein said means for tilting includes a second pair of hydraulic cylinders having extendible rams that are operable for dumping the contents of the dump box located in said main frame when said frame is in an elevated position.

* * * * *